(No Model.)
J. A. ALEXANDER.
SPRING SEAT FOR VEHICLES.
No. 500,789. Patented July 4, 1893.
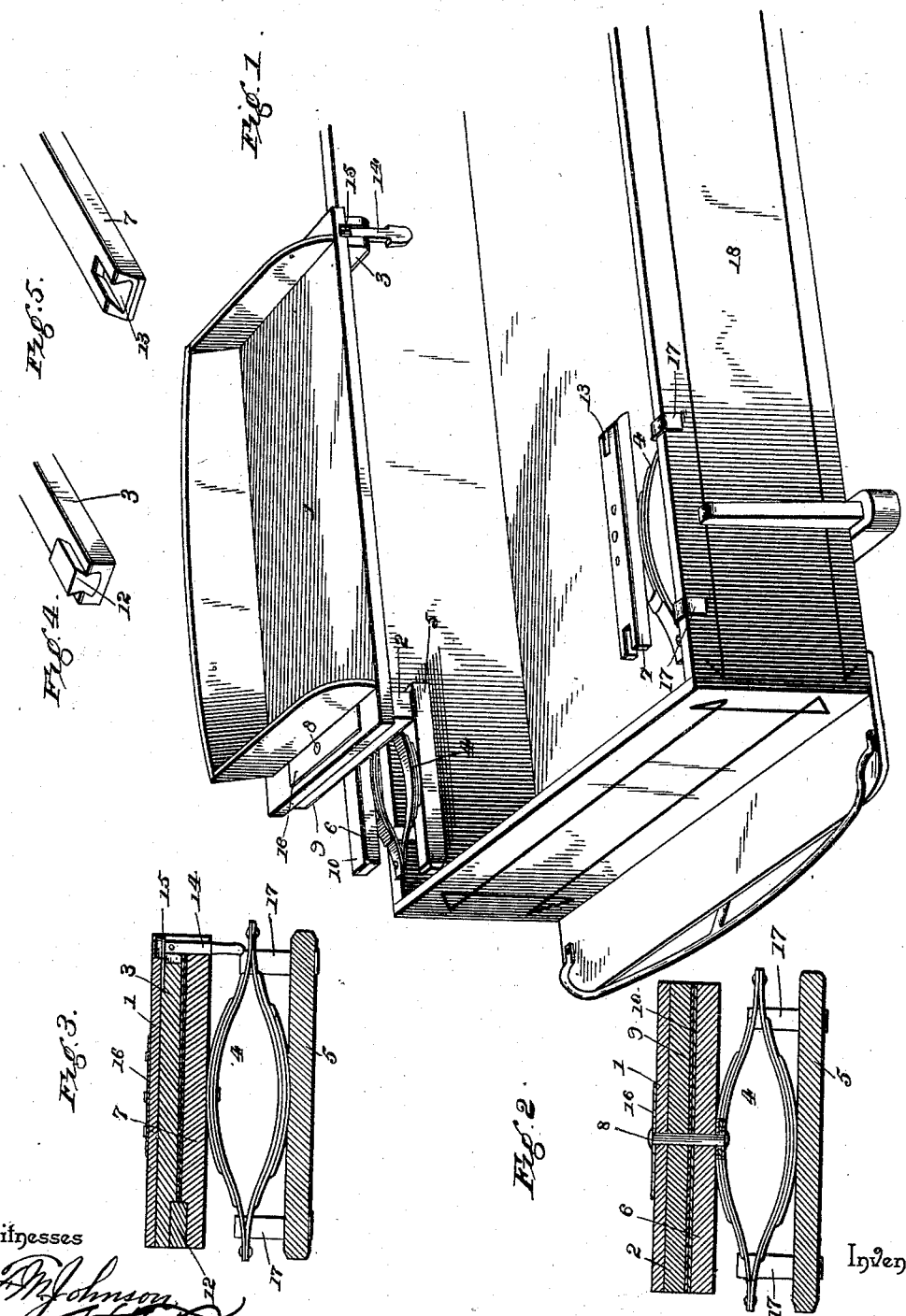
Witnesses
T. M. Johnson
N. T. Riley
Inventor
John A. Alexander
By his Attorneys, C. A. Snow & Co.

UNITED STATES PATENT OFFICE.

JOHN A. ALEXANDER, OF ARDMORE, INDIAN TERRITORY, ASSIGNOR OF ONE-HALF TO JOHN M. ALEXANDER, OF SAME PLACE.

SPRING-SEAT FOR VEHICLES.

SPECIFICATION forming part of Letters Patent No. 500,789, dated July 4, 1893.

Application filed October 20, 1892. Serial No. 449,449. (No model.)

*To all whom it may concern:*

Be it known that I, JOHN A. ALEXANDER, a citizen of the United States, residing at Ardmore, Chickasaw Nation, Indian Territory, have invented a new and useful Spring Vehicle-Seat, of which the following is a specification.

The invention relates to improvements in spring vehicle seats.

The object of the present invention is to provide a spring seat for vehicles adapted to be swung around to one side of a vehicle to be out of the way to permit persons to enter the vehicle at the front thereof and pass the front seat without inconvenience.

The invention consists in the construction and novel combination and arrangement of parts hereinafter fully described, illustrated in the accompanying drawings and pointed out in the claims hereto appended.

In the drawings—Figure 1 is a perspective view of a spring seat constructed in accordance with this invention and shown applied to a vehicle, the seat being swung to one side thereof to provide a free passage to the vehicle at the front thereof. Fig. 2 is a transverse sectional view of the pivoted end of the seat. Fig. 3 is a similar view of the other end of the seat. Fig. 4 is a detail view showing the dove-tailed lug. Fig. 5 is a similar view showing the dovetailed groove.

Like numerals of reference indicate corresponding parts in all the figures of the drawings.

1 designates a seat provided on its lower face at its end with transverse cleats 2 and 3 and supported by elliptic springs 4 which are secured to lower spring bars 5 and to upper spring bars 6 and 7. The cleat 2 of the seat is centrally pivoted to the upper spring bar 6 of the adjacent spring, and the other cleat 3 is detachably secured to the spring bar 7, whereby when it is desired to permit persons to enter a vehicle at the front thereof without being inconvenienced by the front seat, the latter may be swung around as illustrated in Fig. 1 of the accompanying drawings. The pivot 8 serves to secure the spring to the spring bar 6 and the opposed faces of the cleat 2 and the spring bar 6 are provided with wear-plates 9 and 10 to prevent friction and wear of the parts. The rear end of the cleat 3 of the seat is provided with a dove-tailed lug 12 which tapers toward its front end and which is adapted to engage a tapering dove-tailed groove 13 of the rear end of the upper spring-bar 7. The front ends of the cleat 3 and the spring bar 7 are bifurcated, and in the former is pivoted a latch 14 which is provided at its outer end with opposite shoulders, and which is adapted to enter the bifurcation of the spring bar 7 and have its shoulder fit against the lower face of the same, whereby the cleat 3 and the spring bar 7 are detachably secured together. The latch is held against accidental engagement by a spring 15 which is secured in a recess of the seat, and which engages the heel of the latch. The top of the seat is provided with metal plates or straps 16 which strengthen the parts and which are arranged to receive the pivot and the bolt for securing the cleats to the seat. The lower spring bars 5 are provided with hook clips 17 to engage the upper edges of the sides of the body of the vehicle 18.

It will be seen that the seat is pivotally connected with one side of the vehicle, and is detachably secured to the other, and is thereby adapted to be swung out of the way to facilitate loading or unloading the vehicle and to enable easy access to be had to the vehicle at the front thereof, without being inconvenienced by the front seat.

It is to be understood that changes in the form, proportion, and the minor details of construction may be resorted to without departing from the principle or sacrificing any of the advantages of this invention.

What I claim is—

1. A seat comprising springs, upper and lower spring bars, a seat bottom having one end pivoted to one of the upper spring bars, and its other end detachably connected with the other upper spring bar, substantially as described.

2. The combination of the supporting springs, the lower spring bars, the upper spring bar 6 secured to one of the springs, the upper spring bar 7 secured to the other spring and provided with a dove-tailed groove at one end and having its other end bifurcated, a seat provided at one end with a cleat and pivotally connected thereat with a spring bar 6 and provided at its other end with a cleat having a dove-tailed lug engaging said dove-tailed groove, and a latch carried by the seat and engaging the bifurcated end of the spring bar 7, substantially as described.

3. The combination of the lower spring bars provided with clips to engage the sides of a vehicle body, the springs secured to the lower spring bars, the upper spring bars 6 and 7 secured to the springs, the spring bar 7 having one end provided with a dove-tailed groove and its other end provided with a bifurcation, a seat, the cleats 2 and 3 secured to the seat at the ends thereof, the cleat 2 being pivotally connected to the spring bar 6 and the cleat 3 being provided at one end with a dove-tailed lug to engage said dove-tailed groove and having its other end bifurcated, a latch pivoted in the bifurcation of the cleat and provided with shoulders and adapted to engage the bifurcation of the spring bar, and a spring secured to the seat and adapted to engage the heel of the latch, substantially as described.

In testimony that I claim the foregoing as my own I have hereto affixed my signature in the presence of two witnesses.

JOHN A. ALEXANDER.

Witnesses:
LU CRUCE,
L. P. ANDERSON.